US009746911B2

(12) United States Patent
Rallo et al.

(10) Patent No.: US 9,746,911 B2
(45) Date of Patent: *Aug. 29, 2017

(54) SAME LINKING

(71) Applicant: TSO Logic Inc., Vancouver (CA)

(72) Inventors: Aaron Rallo, Vancouver (CA); Gabriel Wiebe, Vancouver (CA); Christopher Tivel, North Vancouver (CA)

(73) Assignee: TSO Logic Inc., Vancouver (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/149,005

(22) Filed: May 6, 2016

(65) Prior Publication Data

US 2016/0252953 A1 Sep. 1, 2016

Related U.S. Application Data

(63) Continuation-in-part of application No. 14/814,266, filed on Jul. 30, 2015, now Pat. No. 9,471,139, which is a continuation of application No. 14/466,712, filed on Aug. 22, 2014, now Pat. No. 9,098,285, which is a continuation of application No. 13/039,214, filed on Mar. 2, 2011, now Pat. No. 8,850,243, application No. 15/149,005, filed on May 6, 2016, which is a continuation-in-part of application No. 15/058,063, filed on Mar. 1, 2016, now Pat. No. 9,639,144, which is a continuation-in-part of application No. 14/561,807, filed on Dec. 5, 2014, now Pat. No.

(Continued)

(51) Int. Cl.
*G06F 1/00* (2006.01)
*G06F 1/32* (2006.01)
*G06F 9/50* (2006.01)
*G06F 11/34* (2006.01)

(52) U.S. Cl.
CPC .......... *G06F 1/3296* (2013.01); *G06F 1/3206* (2013.01); *G06F 1/3209* (2013.01); *G06F 1/3228* (2013.01); *G06F 1/3287* (2013.01); *G06F 9/505* (2013.01); *G06F 9/5083* (2013.01); *G06F 9/5088* (2013.01); *G06F 11/3433* (2013.01); *Y02B 60/1282* (2013.01)

(58) Field of Classification Search
CPC ...... G06F 1/3203; G06F 9/505; G06F 9/5083; G06F 1/329; G06F 11/3433; G06F 9/5088
USPC .......... 713/300, 320, 323; 718/100, 102, 105
See application file for complete search history.

(56) References Cited

U.S. PATENT DOCUMENTS 7,177,901 B1 2/2007 Dutta
7,756,972 B2 7/2010 Ma
(Continued)

FOREIGN PATENT DOCUMENTS

EP 789293 8/2004

OTHER PUBLICATIONS

International Application No. PCT/US2012/027221, International Search Report mailed May 30, 2012.

(Continued)

*Primary Examiner* — Michael J Brown
(74) *Attorney, Agent, or Firm* — Sheppard, Mullin, Richter & Hampton LLP

(57) ABSTRACT

A method and system for managing power consumption of a pool of computing devices that are logically grouped to provide a common set of functionality is disclosed. One aspect of certain embodiments includes determining logically equivalent domains across computer environment silos.

7 Claims, 6 Drawing Sheets

Related U.S. Application Data 9,274,587, which is a continuation-in-part of application No. 14/466,712, filed on Aug. 22, 2014, now Pat. No. 9,098,285, which is a continuation of application No. 13/039,214, filed on Mar. 2, 2011, now Pat. No. 8,850,243, application No. 15/149,005, filed on May 6, 2016, which is a continuation-in-part of application No. 15/058,079, filed on Mar. 1, 2016, which is a continuation of application No. 13/829,216, filed on Mar. 14, 2013, now Pat. No. 9,276,773.

(56) References Cited

U.S. PATENT DOCUMENTS

| | | | |
|---|---|---|---|
| 8,335,208 | B2 | 12/2012 | Denis |
| 8,850,243 | B2 | 9/2014 | Rallo |
| 9,274,587 | B2 | 3/2016 | Rallo |
| 9,471,139 | B2 * | 10/2016 | Rallo .................. G06F 1/3209 |
| 2004/0024853 | A1 | 2/2004 | Cates et al. |
| 2005/0273456 | A1 | 12/2005 | Revanuru et al. |
| 2006/0184287 | A1 | 8/2006 | Belady et al. |
| 2006/0276216 | A1 | 12/2006 | Tongen |
| 2007/0143454 | A1 | 6/2007 | Ma et al. |
| 2008/0082604 | A1 | 4/2008 | Mansour et al. |
| 2008/0104430 | A1 | 5/2008 | Malone et al. |
| 2008/0178029 | A1 | 7/2008 | McGrane et al. |
| 2009/0106571 | A1 | 4/2009 | Low et al. |
| 2009/0187782 | A1 | 7/2009 | Greene et al. |
| 2009/0235104 | A1 | 9/2009 | Fung |
| 2010/0169477 | A1 | 7/2010 | Stienhans et al. |
| 2010/0299549 | A1 | 11/2010 | Day |
| 2011/0022868 | A1 | 1/2011 | Harchol-Balter et al. |
| 2011/0239013 | A1 | 9/2011 | Muller |
| 2012/0065802 | A1 | 3/2012 | Seeber et al. |
| 2012/0144219 | A1 | 6/2012 | Salahshour et al. |
| 2012/0323368 | A1 | 12/2012 | White et al. |
| 2012/0331207 | A1 | 12/2012 | Lassa et al. |
| 2014/0281620 | A1 | 9/2014 | Rallo et al. |

OTHER PUBLICATIONS

International Application No. PCT/US2014/025554, Search Report and Written Opinion mailed Aug. 7, 2014.
International Application No. PCT/US2014/025577, Search Report and Written Opinion mailed Sep. 16, 2014.
International Application No. PCT/US2015/063829, International Search Report and Written Opinion mailed Mar. 31, 2016.
Canadian Patent Application No. 2,905,036, Office Action mailed Sep. 8, 2016.
European Patent Application No. 14774175.5, Search Report mailed Nov. 3, 2016.

* cited by examiner

Class Diagram

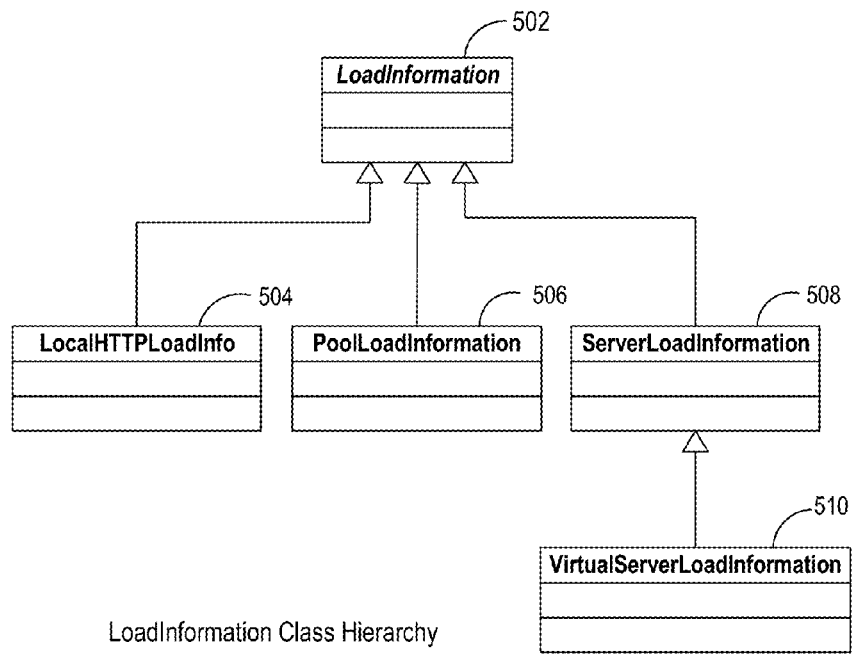
LoadInformation Class Hierarchy
FIG. 5
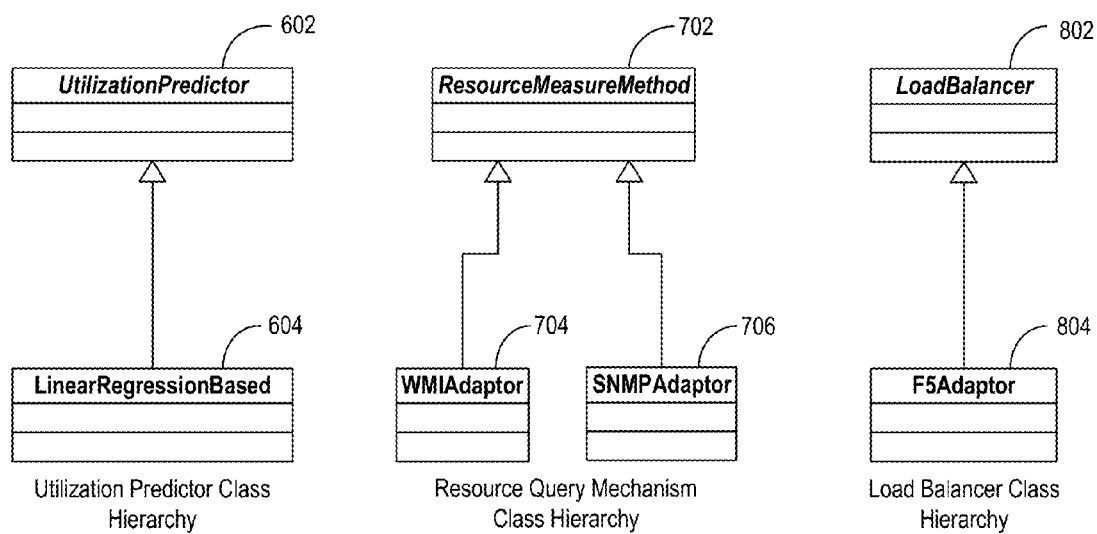
Utilization Predictor Class Hierarchy
FIG. 6
Resource Query Mechanism Class Hierarchy
FIG. 7
Load Balancer Class Hierarchy
FIG. 8

SAME LINKING

CROSS REFERENCE TO RELATED APPLICATIONS

This application is a continuation-in-part of U.S. patent application Ser. No. 14/814,266 filed Jul. 30, 2015, entitled "Non-intrusive Power Management," by Aaron Rallo, which is a continuation of U.S. patent application Ser. No. 14/466,712 filed Aug. 22, 2014, entitled "Non-intrusive Power Management," by Aaron Rallo (now U.S. Pat. No. 9,098,285), which is a continuation of U.S. patent application Ser. No. 13/039,214 filed Mar. 2, 2011, entitled "Non-intrusive Power Management," by Aaron Rallo (now U.S. Pat. No. 8,850,243), each of which is hereby incorporated by reference in its entirety.

This application is also a continuation-in-part of U.S. patent application Ser. No. 15/058,063 filed Mar. 1, 2016, entitled "Power State Adjustment," by Aaron Rallo, which is a continuation-in-part of U.S. patent application Ser. No. 14/561,807 filed Dec. 5, 2014, entitled "Power State Adjustment," by Aaron Rallo (now U.S. Pat. No. 9,274,587), which is a continuation-in-part of U.S. patent application Ser. No. 14/466,712 filed Aug. 22, 2014, entitled "Non-intrusive Power Management," by Aaron Rallo (now U.S. Pat. No. 9,098,285), which is a continuation of U.S. patent application Ser. No. 13/039,214 filed Mar. 2, 2011, entitled "Non-intrusive Power Management," by Aaron Rallo (now U.S. Pat. No. 8,850,243), and each of which is hereby incorporated by reference in its entirety.

This application is also a continuation-in-part of U.S. patent application Ser. No. 15/058,079 filed Mar. 1, 2016, entitled "Control System for Power Control," by Aaron Rallo, which is a continuation of U.S. patent application Ser. No. 13/829,216 filed Mar. 14, 2013, entitled "Control System for Power Control," by Aaron Rallo (now U.S. Pat. No. 9,276,773), and each of which is hereby incorporated by reference in its entirety.

TECHNICAL FIELD

The disclosed embodiments relate generally to IT infrastructure analysis and management. More particularly, the disclosed embodiments relate to deep visibility, real-time monitoring and actionable analytics of an entire IT infrastructure in an enterprise.

BACKGROUND

The proliferation of the Internet, devices that access it, and consequently, Internet based services are driving an insatiable thirst for computational power. To meet this need, large data centers have been set up. Typical data centers house hundreds, maybe even thousands of servers, and serve as the backbone for a variety of Internet services. The services hosted by data centers typically come with the requirement of high availability, close to 99.9% up time, which is usually supported by replicating servers and maintaining spare capacity. Furthermore, data centers are designed for a peak loads which are both occasional and short lived. As a result, data centers tend to consume large amounts of power. In phases that the data center is not fully loaded, idle servers can be shutdown without substantial loss in performance. When the load increases, powered off servers can be booted-up to service the requests and maintain Quality of Service (QoS).

Reducing the power consumption of a data center contributes to reduced operational expense, and allows the data center operator to invest in newer hardware and supporting infrastructure, to save money and/or to provide improved services to customers. Prior studies have reported that servers can draw close to 60% of their peak power consumption when idle, and that the global electricity costs for data centers have been reported as running into the billions. Therefore, substantial reduction in power consumption can be achieved by shutting down idle servers.

Further, the constantly evolving IT landscape is increasingly complex. A deeper understanding of the operations of he IT infrastructure of an enterprise can result in not only savings in power consumption but increasing utilization rates and extending the life of the IT assets, and improving uptime and security of the IT infrastructure.

BRIEF DESCRIPTION OF THE DRAWINGS

For a better understanding of the aspects of the invention as well as embodiments thereof, reference should be made to the description of embodiments below, in conjunction with the following drawings in which like reference numerals refer to corresponding parts throughout the figures.

FIG. 5 illustrates the class diagram for the LoadInformation class hierarchy, according to certain embodiments of the invention.

FIG. 6 illustrates the class diagram for the UtilizatonPredictor class hierarchy, according to certain embodiments of the invention.

FIG. 7 illustrates the class diagram for the ResourcesMeasureMethod class hierarchy, according to certain embodiments of the invention.

FIG. 8 illustrates the class diagram for the LoadBalancer class hierarchy, according to certain embodiments of the invention.

DESCRIPTION OF EMBODIMENTS

Figure 1:
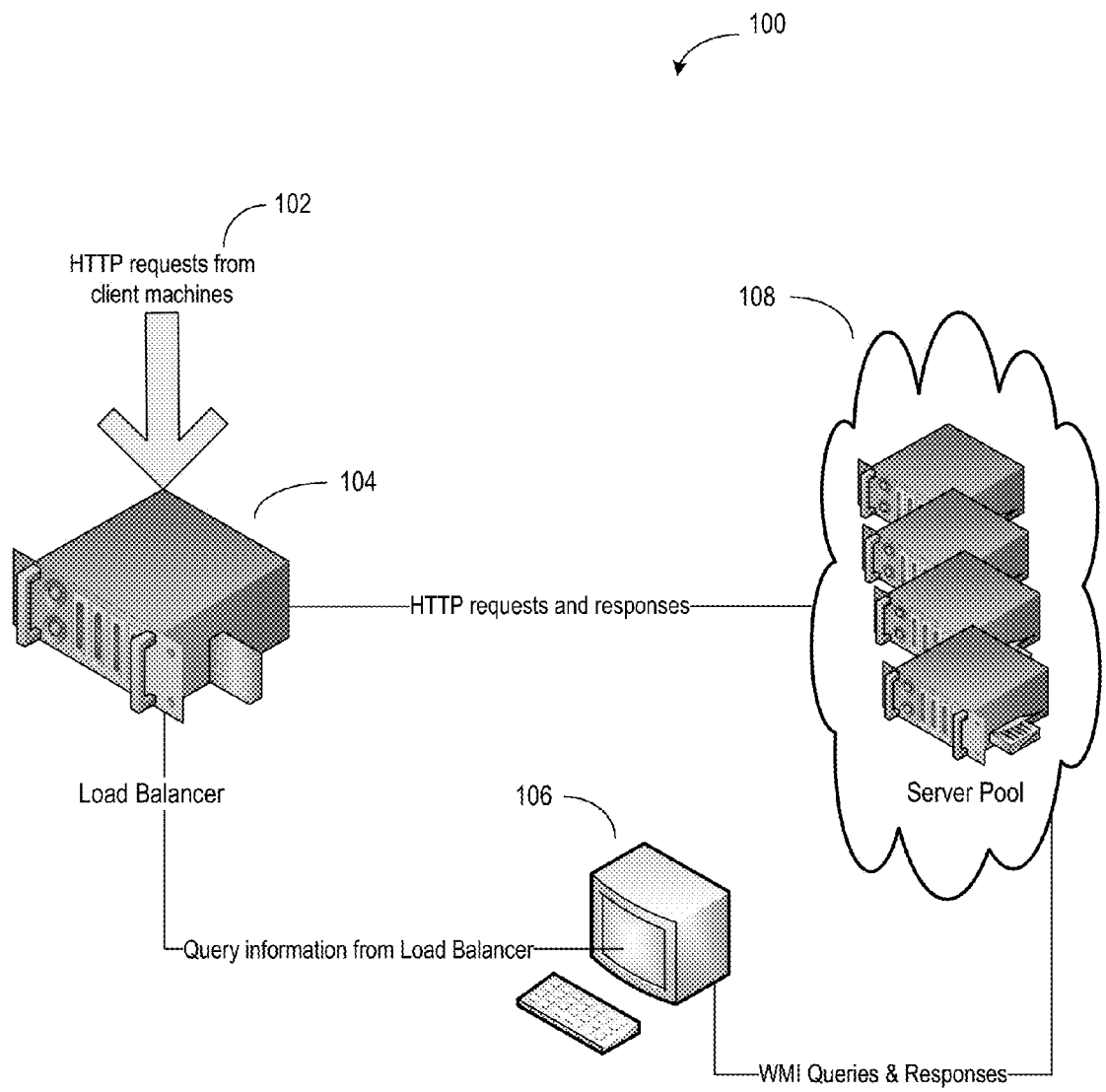
FIG. 1 is a high-level block diagram illustrating power management of a pool of computing devices that are logically grouped to provide a common set of functionality, according to certain embodiments of the invention.

Methods, systems and other aspects of the invention are described. Reference will be made to certain embodiments of the invention, examples of which are illustrated in the accompanying drawings. While the invention will be described in conjunction with the embodiments, it will be understood that it is not intended to limit the invention to these particular embodiments alone. On the contrary, the invention is intended to cover alternatives, modifications and equivalents that are within the spirit and scope of the invention. The specification and drawings are, accordingly, to be regarded in an illustrative rather than a restrictive sense.

Moreover, in the following description, numerous specific details are set forth to provide a thorough understanding of the present invention. However, it will be apparent to one of ordinary skill in the art that the invention may be practiced without these particular details. In other instances, methods, procedures, components, and networks that are well known to those of ordinary skill in the art are not described in detail to avoid obscuring aspects of the present invention.

Certain embodiments described herein are in reference to servers in data centers. However, the embodiments apply to any pool of computing devices that are logically grouped to provide a common set of functionality.

According to certain embodiments, the problem associated with power consumption in data centers can be effectively managed by turning off or turning on servers in response to the load experienced by the data center. Servers are turned on when the load increases and turned off when load decreases. Load can be defined by the number and/or size of requests that are being received by the server pool per unit time interval, for example.

According to certain embodiments, a new server or device is characterized to understand how the resource utilization changes as the number of requests being serviced changes by the server/device. The characterization, using statistical analysis techniques, can be used to predict the utilization of the server/device for a given load. The correlation function associated with the characterization is stored in a database, for example. A power management server can retrieve the correlation function during initialization. The power management server takes decisions at regular time intervals to shutdown a server/device, power-on a server/device or maintain status quo in the pool of servers/devices based on the predicted utilization.

According to certain embodiments, a non-intrusive mechanism is used to power down servers or devices. In contrast, existing power management solutions typically require that the data center operators install software, firmware or hardware on the servers/devices for power management. Such power management decisions are taken by a centralized administrative software component which communicates with the software installed in the individual servers, which then initiate the action. The custom software typically sends information that the centralized entity can use for decision making. Such an approach is intrusive unlike the non-intrusive approach as described in the embodiments herein. The embodiments described herein do not require any such additional software, firmware or hardware installation on each server/device in the data center.

According to certain embodiments, a centralized entity takes power management decisions and initiates them on the servers/devices without the need for custom software, hardware or firmware. The centralized entity uses information exported by the OS only of the servers/devices. Such an approach requires little or no downtime for installation, does not require custom software to be installed, or require any major system reconfiguration.

Further, unlike vendor specific solutions, the embodiments are not restricted to hardware vendors (processor or OEM) or to operating systems.

According to certain embodiments, a virtualization controller with a unified application programming interface (API) communicates with virtual servers. Thus by being able to communicate with both physical servers and virtual servers, tasks and loads can be moved amongst servers based on one or more goals of the data center, such as: 1) identifying ways to save power in the data center by using an automated workload placement engine, 2) repurposing idle hardware (e.g., servers) to support critical projects, 3) improving uptime and security by viewing, in real-time, racks where applications are running, 4) freeing up stranded capacity at a given rack, 5) leveraging applications and departmental data insights in order to enhance planning and coordination efforts, 6) improving disaster preparedness by identifying applications that are less critical and identifying which servers should be powered down first in the event of power shortages, 7) moving workload from less efficient servers to more efficient servers, 8) identifying savings in licensing, hardware costs and labor costs. Thus, real-time data collection and analysis provide baseline measurements, actionable reports and a summary of savings opportunities.

Certain embodiments described herein are in reference to various tools that are data sources (a data source in the context of a data center is also herein referred to as a "domain") within silos. To explain, non-limiting examples of silos include: 1) cloud infrastructure, 2) configuration management databases (CMDB), 3) workload management infrastructure, 4) virtualization infrastructure, 5) operating systems, 6) compute, network & storage infrastructure, 7) data center infrastructure management (DCIM), and 8) facility or building management. The embodiments are not limited to number and types of silos described above. The number and types of silos may vary from implementation to implementation.

According to certain embodiments, domains are sets of tools or data sources associated with one or more of the silos described herein. Non-limiting examples of domains (sets of tools or data sources) include: 1) domains associated with cloud silo such as Windows Azure, and Amazon Web Services, 2) domains associated with CMDB silo such as Racktables, Service Now, and BMC Atrium, 3) domains associated with workload management infrastructure silo such as F5 Big-IP, Qube, Ruckus, Citrix Netscaler, and Openflow enabled switches, 4) domains associated with virtualization infrastructure silo such as VMWare Virtual Center, Docker, Openstack, Microsoft System Center Virtual Machine Manager, and Citrix Xen, 5) domains associated with operating systems silo such as Oracle Solaris, Microsoft Windows, Linux, 6) domains associated with compute, network & storage infrastructure silo such as Avaya, Cisco, Dell, EMC, HP, IBM, Supermicro, 7) domains associated with DCIM silo such as Datacenter Clarity LC, Intel Energy Director, and 8) domains associated with facility or building management silo such as Automated Logic, Panduit, Siemens Struxureware.

According to certain embodiments, analysis of data and information from domains across silos provides comprehensive and deep visibility into data center environments. Further, such comprehensive and deep analysis of data across silos in the entire data center environment provides real-time views via a GUI dashboard that help: 1) identify servers that are in use and see their associated costs, 2) identify servers that are in use but idle and see their associated costs, 3) identify servers that are comatose and see their associated costs (comatose servers are servers that are abandoned by application owners but are still actively drawing power and resources in a rack at the data center), 4) to decommission servers, 5) in replacing servers, 6) make smarter purchasing decisions with respect to hardware and software to improve ROI of the data center, 7) determine utilization rates and workload efficiencies of the servers, 8) correlate server performance with application performance, 9) provide showback reporting by department or by application (showback is a responsibility accounting system that quantifies expenses of each department and/or application), and 10) provide cost-benefit analysis of running applications on premises versus via a cloud provided.

FIG. 1 is a high-level block diagram illustrating power management of a pool of computing devices that are logically grouped to provide a common set of functionality, such as servers in a data center, according to certain embodiments of the invention. In FIG. 1, system 100 includes an application delivery controller 104 that receives HTTP requests 102 from client devices, and a computer 106 that executes the power manager. Application delivery controller 104 sends the HTTP requests 102 to the server pool 108 and also receives the responses to the HTTP requests from server pool 108. The power manager implemented in computer 106 receives information from application delivery controller 104 and information from the server pool 108 to make power management decisions. The power manager may be implemented on multiple computers as in a distributed computer system, according to certain embodiments. Application delivery controller 104 may be a commercial off-the-shelf load balancer, according to certain embodiments. Similarly, computer 106 can be an off-the-shelf computer on which the power management solution is installed and executes. Server pool 108 or server cluster comprises server machines or nodes that service requests from client devices via application delivery controller 104. An application delivery controller is hardware or software that manages requests received from client devices and distributes such requests to the computing devices in the server pool. A non-limiting example of an application delivery controller is a load balancer.

HTTP requests initiated by client devices reach application delivery controller 104 which redirects the requests to an appropriate server in the server pool 108. According to certain embodiments, application delivery controller 104 is configured to use a round robin policy. Consequently, server nodes in server pool 108 service a comparable number of requests. The power manager interacts with application delivery controller 104 to obtain information including but not limited to:

Information on the number of requests being executed by each server in server pool 108,
the average response time by each server in server pool 108, and
information on server state.

The power manager does not service any requests from client devices. The power manager's job is to make power management decisions and initiate such decisions, while maintaining consistency between actual server state and information at application delivery controller 104.

According to one aspect of certain embodiments, each server of at least a subset of servers in the server pool is characterized for the utilization behaviour of that particular server. Characterization involves measuring on the server to be characterized, the utilization of various resources as the number of requests being executed by the server varies. Such measurement information is utilized to draw correlations between the number of requests being serviced by the server that is being characterized and its utilization of resources, according to certain embodiments. The power manager (computer 106) can remotely query the servers in server pool 108 to obtain resource utilization information using standardized protocols like Simple Network Management Protocol (SNMP) for any OS or Windows Management Instrumentation (WMI) for MS Windows. The correlation drawn can be used to predict the utilization of a given server for any given number of HTTP requests being serviced per minute, according to certain embodiments. According to certain embodiments, the characterization is performed using the same application that the server to be characterized is expected to execute in production because a server can be expected to show differences in behaviour with different application types.

According to certain embodiments, correlation information is obtained using well established statistical analysis techniques such as linear regression. The statistical analysis can be performed using any commercially/freely available statistical analysis software such as R statistical software. According to certain embodiments, the correlation information is an expression that correlates the number of requests to the CPU utilization. According to some embodiments, this correlation information is XML serialized and inserted into a database along with other information that the power management solution requires. XML serialization is the process of converting a binary object in memory into an XML representation that can then be stored on disk (files or database). For purposes of simplicity, the statistical analysis is done in the background and the results are stored in the database. The process of deriving correlations can be made real time, according to certain embodiments.

Figure 2:
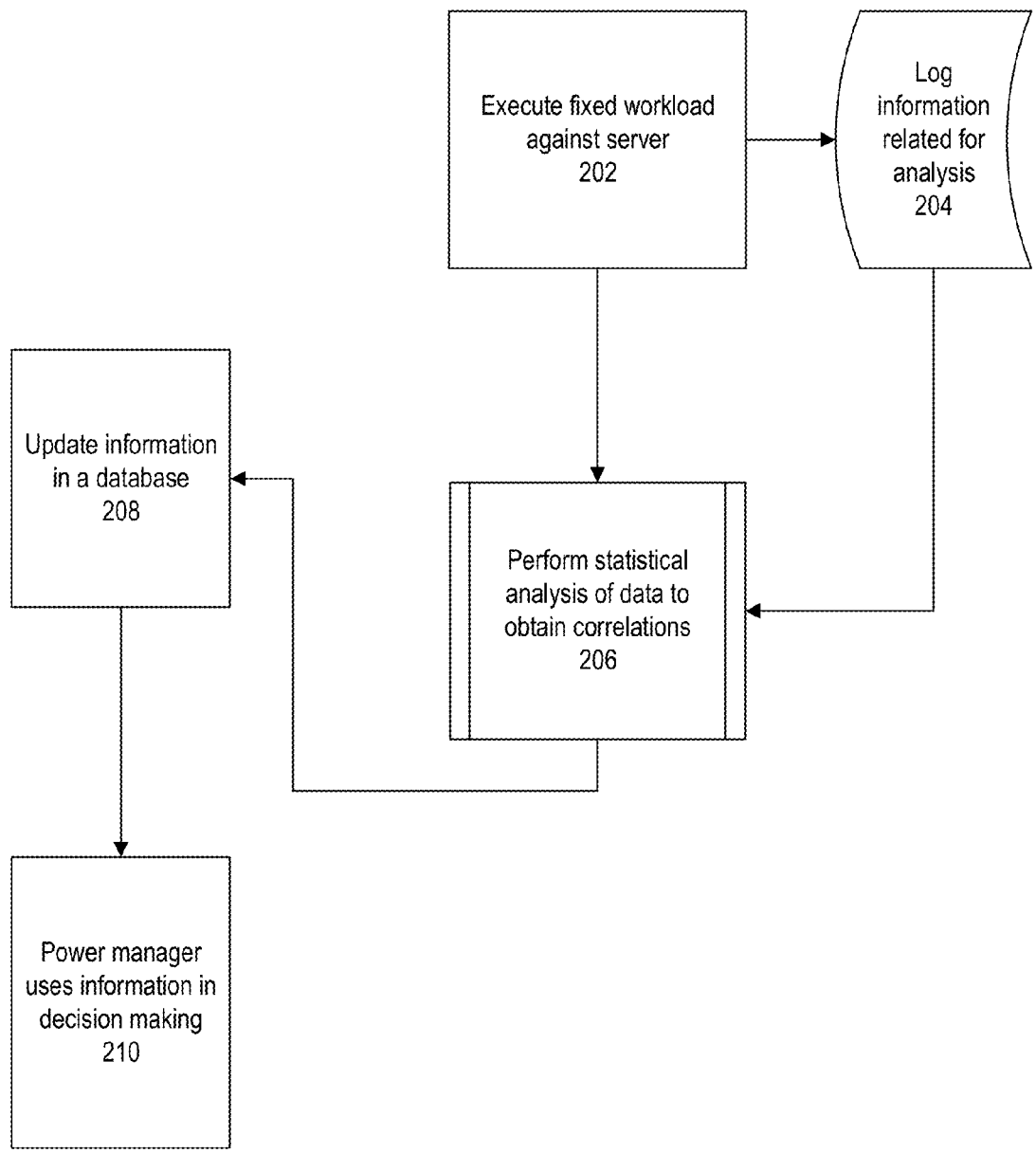
FIG. 2 is a block diagram showing some of the high-level steps for obtaining correlation information associated with the servers in the server pool, according to certain embodiments of the invention.

FIG. 2 is a block diagram showing some of the high-level steps for obtaining correlation information associated with the servers in the server pool, according to certain embodiments of the invention. At block 202, a fixed workload is executed against a given server that is to be characterized. At block 204, the information on resource utilization, workload and other related information is logged for analysis. At block 206, statistical analysis is performed on the information to obtain correlation information. At block 208, the correlation information for the given server is stored in the database. If the database already contains correlation information for the particular server, then the correlation information is updated. At block 210, the power manager retrieves correlation information for making power management decisions.

The power manager runs at regular intervals. For example, the power manager can run every 10 seconds. At each iteration of the power manager solution, a decision is taken as to whether a server needs to be powered on or powered off. The power manager also identifies which server must be powered on or off based on a server selection policy. The server selection policy is described herein.

Figure 3:
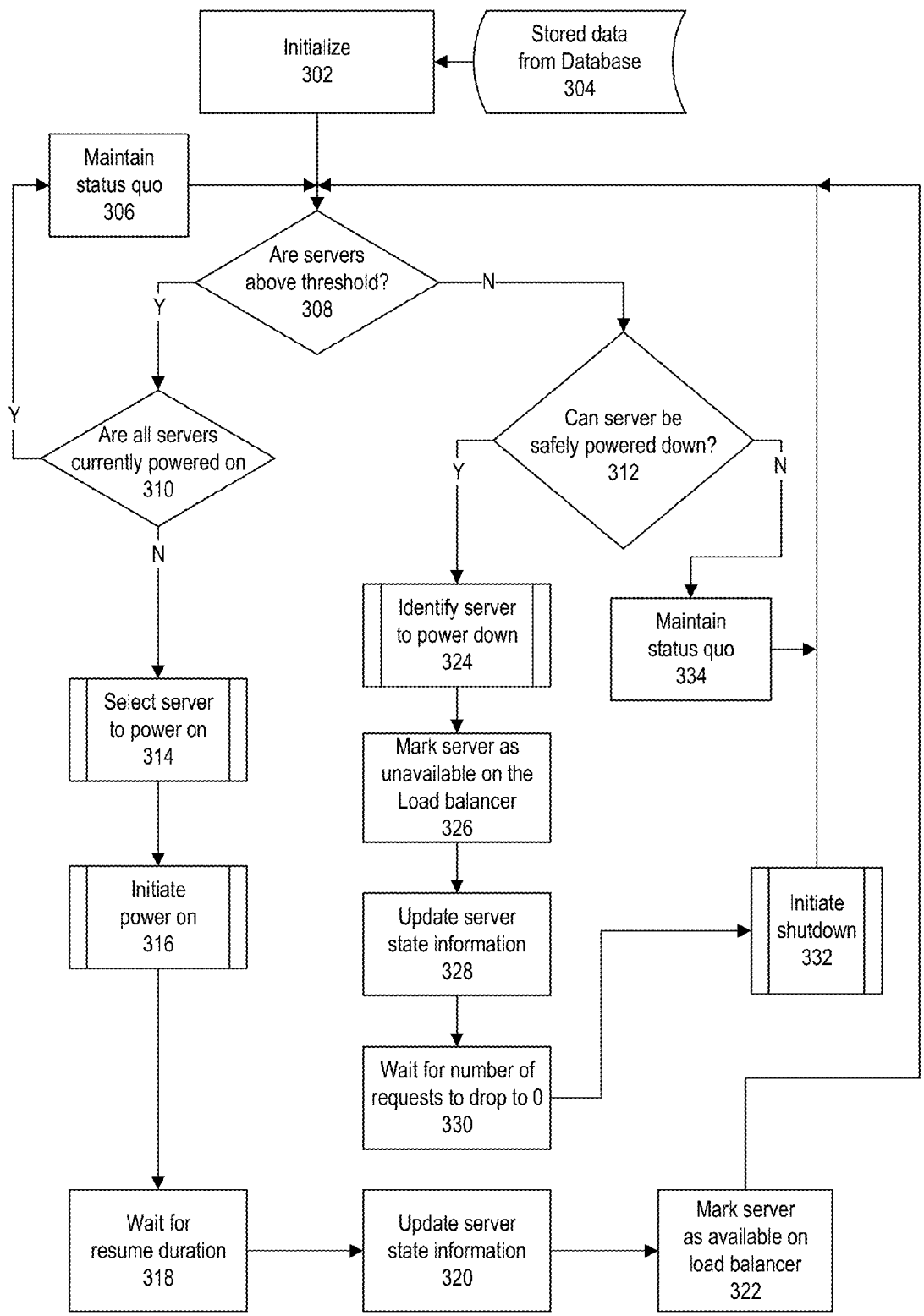
FIG. 3 is a block diagram that illustrates a power management method, according to certain embodiments of the invention.

FIG. 3 is a block diagram that illustrates the power management method, according to certain embodiments of the invention. After initialization at block 302, correlation data is retrieved from the database at block 304. At block 308, on each iteration, the power manager checks if all the servers in the server pool are above a pre-configured utilization threshold called the overload threshold, according to certain embodiments. According to certain other embodiments, the utilization threshold is determined dynamically rather than being pre-configured. If all the servers are above the utilization threshold, then at block 310, the power manager determines if all the servers in the server pool are powered on. If all the servers are powered on, then at block 306, the status quo of the server pool is maintained. If not all servers in the server pool are powered on, then at block 314, the power manager identifies which server is to be powered on, if more than one server is not powered on in the server pool. At block 316, the power manager initiates power-on process for the selected server. At block 318, the power manager waits for the resume duration. At block 320, the power manager updates the state information for the selected server that was just powered on. At block 322, the server that was just powered on is marked on the application delivery controller as available for servicing requests.

If at block 308, it is determined that not all the servers in the server pool are below the utilization threshold, then at block 312 a check is made to identify if any server in the server pool can be powered off safely. If none of the servers in the server pool can be powered off safely, then the status quo is maintained at block 334.

If there are servers in the server pool can be powered off, then at block 324, the power manager identifies a server to be powered off. The server identified to be powered off is referred to as a candidate server. A decision to power off is taken only if the load on the candidate server can be migrated to the remaining power-on servers in the server pool without causing such remaining power-on servers to cross an overload threshold associated with a given server. At block 326, the server identified to be powered off is marked as unavailable on the application delivery controller. At block 328, the state information of the server to be powered off is updated. At block 330, the power manager waits for the number of requests sent to the server to be powered off drops to zero. At block 332, the power manager initiates the power-off process for the server to be powered off.

Powering servers on or off can be done using existing mechanisms supported by operating systems of the servers. For example, Windows Management Instrumentation (WMI) on Microsoft Windows or ssh based remote command execution on Linux/Solaris can be used for powering servers off.

According to certain embodiments, a staggered suspend and boot up process is used at a given point in time. In other words, exactly one server is suspending or resuming at a given time. The staggered suspend ensures that there is capacity in the server pool to handle any spikes in the load and thus is a conservative approach. Staggered resume ensures that the load on the power supply for the server does not go high because computers typically draw higher power during the boot up phase.

According to certain embodiments, the power management method can include the following features:

Predicting the demand: Historical data can be analysed to predict the demand that the server pool will experience in the next time interval. The prediction can augment the decisions taken by the power manager. Existing statistical methods like Auto Regressive Moving Average can be used for the time based trend analysis and prediction.

Predict the number of servers or devices required to support a given workload.

Chart the response time and performance of a server or a device under a given workload.

Moving server nodes across pools: The power management method described herein can be extended to multiple pools using a global power management scheme. In such a global power management scheme, it is possible to move servers across pools to serve the needs of various pools. Depending on the demand, servers can be either moved across pools or turned on/off.

The Advanced Configuration and Power Interface (ACPI) specification defines the following server states, according to certain embodiments. Other suitable standards for defining server states can also be used. The embodiments are not restricted to the ACPI standard.

TABLE 1

ACPI Server States

| Server state | Global State | Description |
|---|---|---|
| S0 | G0 | Server is powered on and operational. |
| S1 and S2 | G1 | Undefined and unused. |
| S3 | G1 | Suspended to RAM - Operating system context stored in RAM and most components powered down. Typically RAM and NIC are active in this state. |
| S4 | G1 | Suspend to Disk - Operating system context is written to disk and server is powered down. |
| S5 | G2 | Soft off - Server is powered down, no OS context is retained. |
| S5 | G3 | Mechanical off - Server is powered down and main power supply is cut off. |

According to certain embodiments, servers are switched between S0 and S5.

If all the servers in the server pool have similar properties like operating frequency, RAM, disk space etc, the choice of server to shutdown/resume become trivial because any server can be chosen. However, if the server pools are heterogeneous pools, where servers differ in their properties, then a server selection policy is needed in order to select an appropriate server to power on or off. According to certain embodiments, policies that can be used to select servers if multiple servers are available for shutdown/resume are described below:

Polices for server power off include but are not limited to:
1. Lowest Frequency: Power off the server that operates at the lowest frequency.
2. Highest power: Power off the server that consumes the highest power.
3. Max post-utilization: Power off the server that will result in other servers having high utilization.
4. Types of applications running on the system (application capabilities).

The policies for server power on include but are not limited to:
1. Lowest power: Power on the server that consumes lowest power.
2. Highest frequency: Power on the server that runs at the highest frequency.
3. Shortest Resume Time: Power on the server that takes the shortest time to boot up.

As a non-limiting example, suspend policy 3 (max post-utilization) and resume policy 2 (highest frequency) can be used, according to certain embodiments. It is possible to support any combination of policies, but the power management mechanism must ideally be configured to use the ones that provide high power savings without significant loss in performance. Further, different combinations of suspend and resume policies will show different power/performance characteristics.

At any point in time, at least one server will be active in the pool. The reasoning behind having at least one server active is to have available computational capacity to handle requests while other servers are resuming.

As a non-limiting example, turning servers off is achieved by issuing a remote shutdown command using WMI (as our cluster is currently MS Windows based). Remote command execution requires that appropriate services are enabled on the server and appropriate ports are kept on in the firewall. Alternate techniques can be used for Linux and Solaris. Servers are turned on using Wake-On-LAN (WoL), an industry standard technique to resume computers that are currently suspended. A WoL packet is a specially crafted network packet which contains a WoL header and the MAC address of the target server repeated 16 times. WoL packet definition is standardized. WoL must be supported by the network interface card (NIC) and also enabled by the operating system driver. Modern NICs typically support WoL.

Such a non-intrusiveness approach does not require any additional software components to be installed on the individual servers in the server pool for the power manager to work. At most, it requires certain standard operating system services which might be turned off by default (like ssh, snmp) to be turned on.

Figure 4:
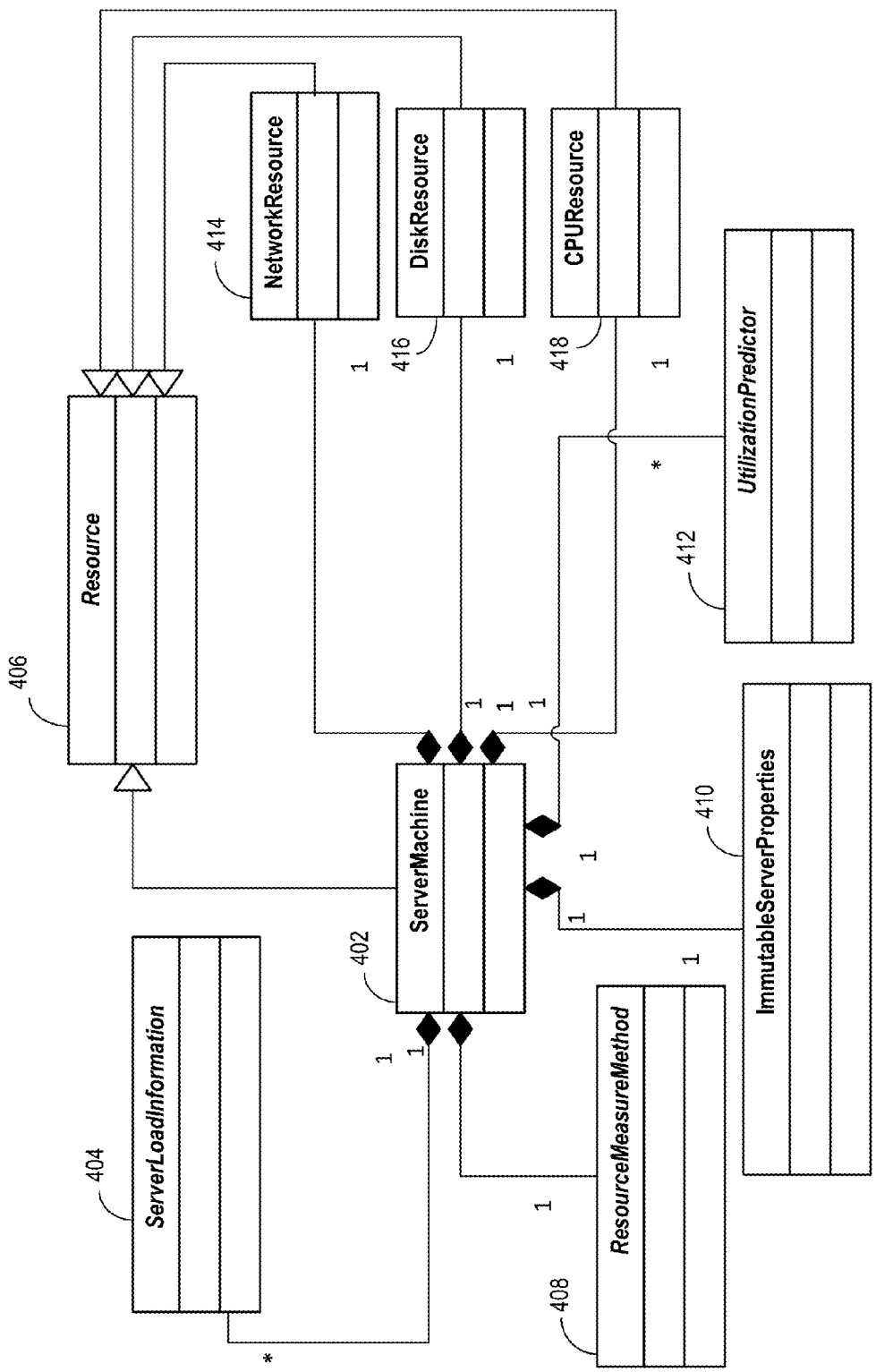
FIG. 4 illustrates the class diagram of the central classes used for implementing the power manager, according to certain embodiments of the invention.

FIG. 4 illustrates the class diagram of the central classes used for implementing the power manager, according to certain embodiments. FIG. 4 shows ServerMachine class 402, ServerLoadInformation class 404, Resource class 406, ResourceMeasureMethod class 408, ImmutableServerProperties class 410, UtilizationPredictor class 412, NetworkResource class 414, DiskResource class 416, and CPUResource class 418. The central data structure to the application is a ServerMachine class 402 that holds information about a server in the server cluster. The ServerMachine class contains the immutable server properties (like MAC address, maximum operating frequency, power consumption etc) and dynamically created objects for measuring resource utilization (see FIG. 7), predicting the utilization (FIG. 6), storing load information (FIG. 5) etc. A server contains resource objects—CPU, Disk, network, and memory, and is a resource in itself. The utilization predictor for each server is read from on disk storage (a database, for example) as an XML serialized stream and then de-serialized to get the object.

Some of the hierarchies of other classes used in the implementation of the power manager are described herein with reference to FIGS. 5-8.

FIG. 5 illustrates the class diagram for the LoadInformation class hierarchy, according to certain embodiments. LoadInformation class defines classes that are used to store information on connections/requests queried at regular intervals from the load balancer or server. FIG. 5 shows that LoadInformation class 502 includes LocalHTTPLoadInfo class 504, PoolLoadInformation class 506, and ServerLoadInformation class 508. ServerLoadInformation class 508 includes VirtualServerLoadInformation class.

FIG. 6 illustrates the class diagram for the Utilization Predictor class hierarchy, according to certain embodiments. Utilization Predictor class 602 includes LinearRegression-Based class 604.

FIG. 7 illustrates the class diagram for the Resources-MeasureMethod class hierarchy, according to certain embodiments.

ResourcesMeasureMethod class 702 includes WMIAdaptor class 704 and SNMPAdaptor class 706.

FIG. 8 illustrates the class diagram for the LoadBalancer class hierarchy, according to certain embodiments. LoadBalancer class 802 includes F5Adaptor class 804. The load balancer class hierarchy is used to define classes that can be used to query and control the load balancer.

According to certain embodiments, a simple database with a single table is used to store information about individual servers.

The characterization phase requires utilization information to be gathered from servers for later analysis. According to certain embodiments, this information is stored in a database. The utilization information of each resource is stored in a separate file with the format shown in Table 2 Utilization Information, as non-limiting example.

TABLE 2

| Utilization information | | |
| --- | --- | --- |
| Date-Time stamp | Resource utilization (varying from 0-100%) | Weighted Moving average utilization (0-100%) |

The weighted moving average is used to help smoothing any sharp fluctuations in the measured utilization. An example for CPU utilization on a dual core machine, measured using WMI is given below.

| Date-Time stamp | Core 0 | Core 1 | Total | Moving Avg (Core 0) | Moving Avg (Core ) | Moving Avg (Total) |
| --- | --- | --- | --- | --- | --- | --- |

The level of detail—per core utilization—is not provided by SNMP implementations. However, overall system utilization is available and the power manager implementation uses the overall utilization for analysis and decision making.

Each domain (set of tools or data source) of each silo operating in the data center environment is associated with a set of properties. Further, each domain has its own method of identifying components in its domain (herein referred to as "domain components"). To explain, equivalent components in respective domains may have different names or identifiers despite being logically equivalent. In order to collect metrics and analyze metrics across silos in an entire data center or across a specified swath of the data center environment, logically equivalent components in respective domains need to be identified.

According to certain embodiments, logically equivalent components across domains and across silos are identified using analyses (herein referred to as "Samelinking" analyses) such as: 1) property Samelinking, 2) metric data Samelinking, 3) transitive Samelinking, and 4) relationship Samelinking.

According to certain embodiments, with respect to the property Samelinking analysis, two given domain components are logically equivalent if the two given domain components have one or more properties (or functions) in common.

For example: If property X of component A is equivalent to property Y of component B, then component A is logically equivalent to component B.

To illustrate, consider a component, such as HostSystem, of Domain VMWare Virtual Center in the virtualization infrastructure silo. Since "property X" of HostSystem is logically equivalent to "property Y of component Blade in the DCIM silo, then HostSystem is logically equivalent to Blade. As a non-limiting example, in the above case, the property can be "Name" for HostSystem and the equivalent property for component Blade in the DCIM is "FQDN" (FQDN stands for Fully Qualified Domain Name). Thus, "Name" and "FQDN" are logically equivalent properties.

According to certain embodiments, comparison of more than one property is needed in order to determine if two components are logically equivalent.

For example: If property X of component A is equivalent to property Y of component B, AND property C of component A is equivalent to property D of component B, then component A is logically equivalent to component B.

To illustrate, consider a component, such as Virtual Machine of Domain VMWare Virtual Center in the virtualization infrastructure silo and a component such as an Operating System of a Domain in the operating system silo. If any VMware.VirtualMachine.Name is logically equivalent to f(OperatingSystem.FQDN), where f(x) is: x.split(".")[0], then the Virtual Machine component is logically equivalent to Operating System.

According to certain embodiments, one or more properties of a given domain component may need to be transformed before a comparison can be made in order to determine if two components are logically equivalent.

For example: if a property is a string, the string may need to be truncated or reformatted. If property X of component A is logically equivalent to f(property Y of component B), then component A is logically equivalent to component B, where f is transformation function relevant to the particular property at issue. As a non-limiting example, the transformation function in the above case is truncation or a reformat of the string in question.

According to certain embodiments, with respect to the metric data Samelinking analysis, two given domain components are logically equivalent if the two given domain components have statistically identical values with respect to certain measurements.

For example, if the network bytes egress metrics of component A are identical to that of component B over a period of time, then component A is logically equivalent to component B.

According to certain embodiments, with respect to the transitive Samelinking analysis, two given domain components are logically equivalent if the two given domain components have statistically identical values with respect to certain measurements.

For example, if component A is determined to be logically equivalent to component B, and component B is considered to be logically equivalent to component C, then component A is logically equivalent to component C.

To illustrate:
Assume that A==F5 PoolMember; B==Windows Operating System Instance; C==VMware Virtual Machine;
if A.IPAddress is in B.IPAddresses===>then component A is logically equivalent to component B.
if B.HostName==f(C.FQDN)===>then component B is logically equivalent to component C.
Therefore: Component A is logically equivalent to component C.

According to certain embodiments, with respect to the relationship Samelinking analysis, two given domain components are logically equivalent if each of the two given domain components share an equivalent relationship with two other domain components that are determined to be logically equivalent.

Figure 9:
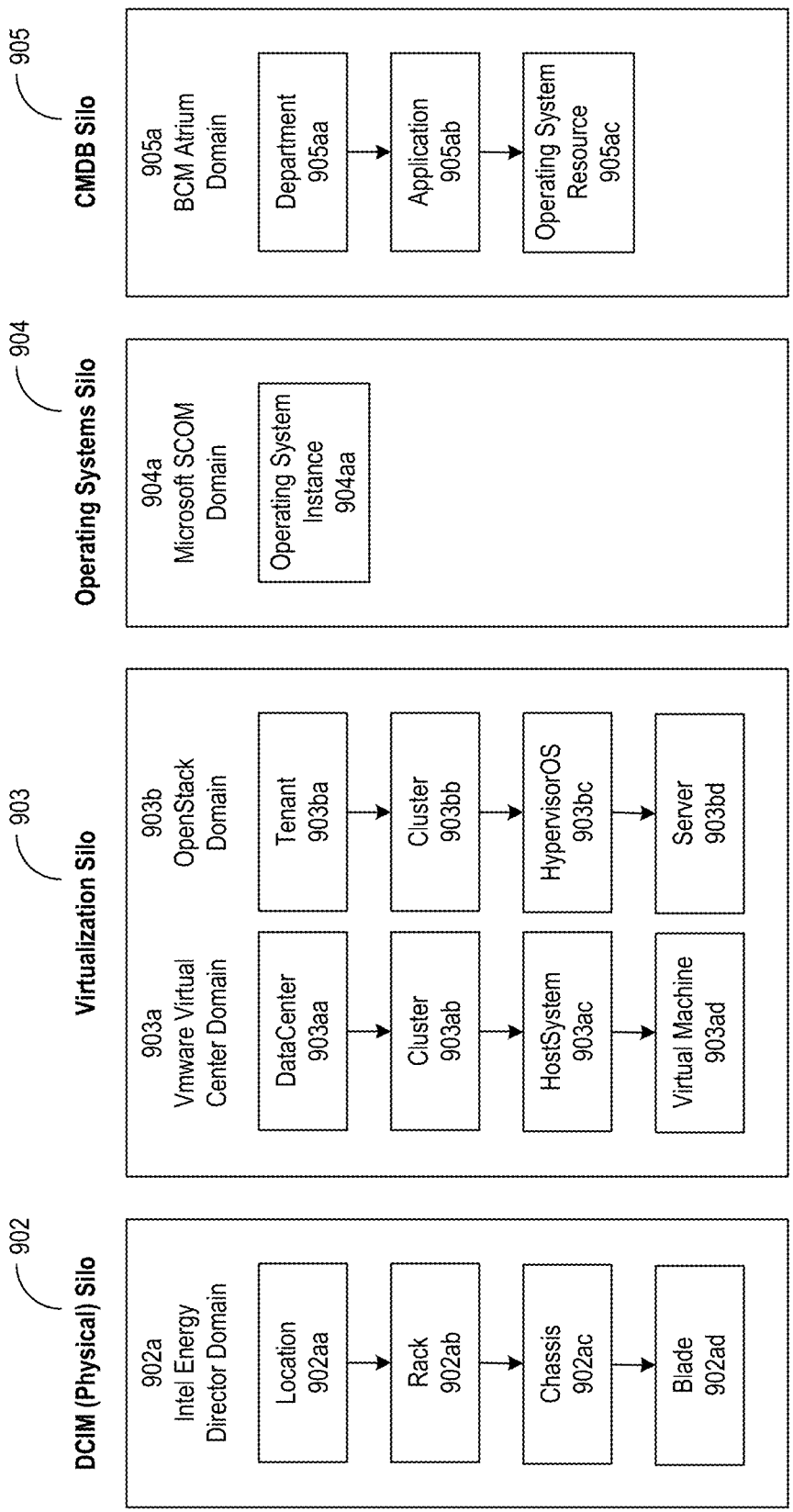
FIG. 9 is a high-level drawing that illustrates the relationship Samelinking analysis, according to certain embodiments.

FIG. 9 is a high-level drawing that illustrates the relationship Samelinking analysis, according to certain embodiments. FIG. 9 shows four silos: an DCIM silo 902, a virtualization infrastructure silo 903, an operating system silo 904, and a CMDB silo 905. The embodiments are not limited to 4 silos and are further not limited to the silos shown in FIG. 9. The number and types of silos may vary from implementation to implementation. In FIG. 9, DCIM silo 902 includes the Intel Energy Director domain 902a that, in turn, comprises location information 902aa, rack information 902ab, chassis information 902ac, and blade information 902ad. Virtualization infrastructure silo 903 includes the VMWare Virtual Center domain 903a and the OpenStack domain 903b. VMWare Virtual Center domain 903a, in turn, comprises data center information 903aa, cluster information 903ab, HostSystem information 903ac, and virtual information 903ad. OpenStack domain 903b, in turn, comprises tenant information 903ba, cluster information 903bb, hypervisor OS information 903bc, and server information 903bd. Operating systems silo 904 includes the Microsoft System Center Operations Manager (SCOM) domain 904a that, in turn, comprises operating system instance 904aa. CMDB silo 905 includes the BCM Atrium domain 905a that, in turn, comprises department information 905aa, application information 905ab, and operating system resource information 905ac.

As can be seen from FIG. 9, each domain uses different identification/names to represent each node in their respective domains. As a non-limiting example, the Intel Energy Director domain may identify a compute blade (902ad) by its serial number while the VMWare Virtual Center domain a corresponding logically same component as a HostSystem (903ac).

In FIG. 9, operating system resource 905ac is samelinked to operating system instance 904aa because they are logically equivalent. Operating system instance 904aa is samelinked to virtual machine 903ad because they are logically equivalent. Blade 902ad is samelinked to hostsystem 903ac because they are logically equivalent. Further, operating system resource 905ac is a child of application 905ab, that in turn is a child of department 905aa. Further, virtual machine 903ad is a child of hostsystem 903ac. Further, blade 902ad is the child of chassis 902ac, that in turn is the child of rack 902ab. Thus, based on the foregoing samelinking relationships and parent-child relationships, it follows that department 905aa has resources running on rack 902ab.

We claim:

1. A method of power management in a computer system, the method comprising:
using a computerized power manager, in the computer system, for managing resource utilization associated with each computing device from at least a subset of computing devices of a plurality of computing devices;
receiving, by the computerized power manager, real-time information from an application delivery controller, the real-time information including information on a quantity of requests and information on size of a request; and
dynamically selecting, by the computerized power manager, a candidate computing device from the subset of computing devices for controlling a power state of the candidate computing device or moving one or more virtual servers from or to the candidate computing device based on at least information related to one or more of the following:
identifying, in the computer system, a first set of domain components that have equivalent properties;
identifying, in the computer system, a second set of domain components that have equivalent metric data; and
identifying, in the computer system, a third set of domain components that share an equivalent relationship with a fourth set of domain components in the computer system.

2. The method of claim 1, further comprising determining that if a first domain component is logically equivalent to a second domain component and if the first domain component is also logically equivalent to a third domain component, then the first domain component is logically equivalent to the third domain component.

3. The method of claim 1, wherein the dynamically selecting, by the computerized power manager, the candidate computing device from the subset of computing devices for controlling the power state of the candidate computing device is further based on:
- a number of requests being executed by each computing device from the at least a subset of computing devices of the plurality of computing devices; and
- average response time by each computing device from the at least a subset of computing devices of the plurality of computing devices.

4. The method of claim 1, wherein the dynamically selecting, by the computerized power manager, the candidate computing device from the subset of computing devices for controlling the power state of the candidate computing device is further based on:
- a CPU utilization of each computing device from the at least a subset of computing devices of the plurality of computing devices;
- a utilization threshold associated with the at least a subset of computing devices of the plurality of computing devices; and
- costs associated with each computing device from the at least a subset of computing devices of the plurality of computing devices.

5. The method of claim 1, further comprising determining a respective silo corresponding to each domain component.

6. The method of claim 1, wherein the dynamically selecting, by the computerized power manager, a candidate computing device from the subset of computing devices for controlling the power state of the candidate computing device is further based on:
- information associated with the equivalent properties;
- information associated with the equivalent metric data; and
- information associated with the equivalent relationships.

7. The method of claim 1, further comprising:
- measuring resource utilization on a respective computing device for a given number of requests executed by the respective computing device;
- obtaining correlation information between the measured resource utilization and the number of requests executed by the respective computing device; and
- using a set of power utilization criteria.

* * * * *